Sept. 15, 1925.
S. WILLOCK
1,554,058
GATE
Filed July 24, 1924
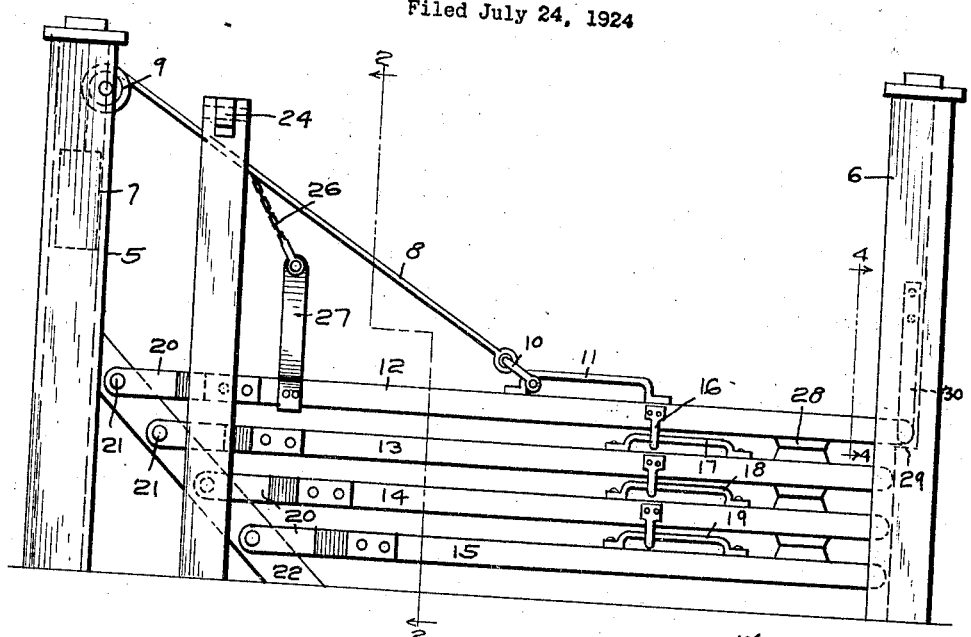
Fig. 1.
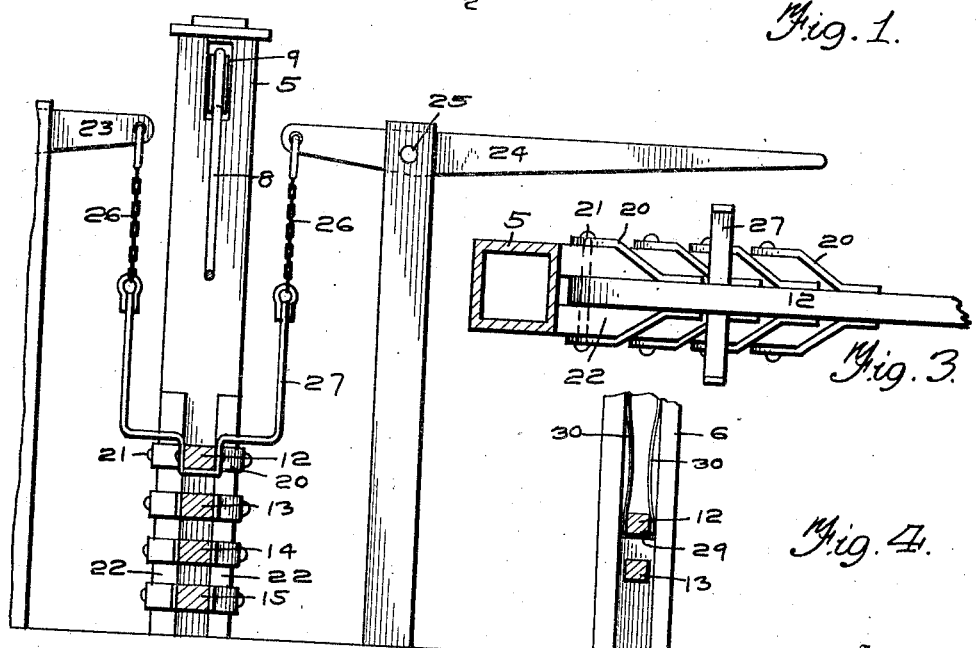
Fig. 2.
Fig. 3.
Fig. 4.
Inventor
Scott Willock,
By Samuel Herrick,
Attorney Patented Sept. 15, 1925.

1,554,058

UNITED STATES PATENT OFFICE.

SCOTT WILLOCK, OF CODY, WYOMING.

GATE.

Application filed July 24, 1924. Serial No. 727,913.

*To all whom it may concern:*

Be it known that SCOTT WILLOCK, citizen of the United States, residing at Cody, in the county of Park and State of Wyoming, has invented certain new and useful Improvements in Gates, of which the following is a specification.

This invention relates to gates and it has for its object to provide an improved device of this character consisting of a plurality of hinged sections connected to move in unison and to swing in a vertical plane, together with an operating means for the same of such a nature that a person in a vehicle may operate the gate without leaving such vehicle.

Further objects and advantages of the invention will be set forth in the detailed description which follows:

In the accompanying drawings, Fig. 1 is a side elevation of a gate constructed in accordance with the invention.

Fig. 2 is a sectional view, on line 2—2 of Fig. 1.

Fig. 3 is a horizontal sectional view through one of the gate posts and

Fig. 4 is a fragmentary sectional view on line 4—4 of Fig. 1.

Like numerals designate corresponding parts in all of the figures of the drawing.

Spaced gate posts are indicated at 5 and 6. The post 5 is hollow and receives a counterweight 7. A cable 8 connected to this counterweight passes over a pulley 9 that is located at the upper part of the post 5. The upper end of this cable is attached to an eye 10 which is engaged with a strap 11. This strap is fixed to the uppermost one of a series of bars 12, 13, 14 and 15. Each of the bars 12, 13 and 14 has a depending eye 16 extending therefrom and these several eyes engage straps 17, 18 and 19 that are fastened to the upper edges of the bars 13, 14 and 15 respectively. Yokes 20, to which the rear or left hand ends of the bars in Fig. 1 are attached, are pivoted at 21 to the inclined bars 22 which extend from the post 5 to the ground. It is manifest that with the construction previously described, if the uppermost bar 12 is swung upwardly upon its hinge 21 the other bars will be carried with it. Upward swinging movement may be imparted to these bars in the manner described, through the medium of operating handles 23 and 24 that are pivoted in posts 25. These operating handles extend away from the gate and in the line of travel, and upon opposite sides of the gate. Chains 26 connected to the short ends of the handles have their lower portions attached to the U-shaped yoke 27, which extends beneath and is secured to the uppermost rail or bar 12.

Thus it is clear that by pulling downwardly upon the outer ends of the handles 23 and 24 the uppermost bars 12 will be swung upwardly and that this, in turn, will carry with it all of the other bars 13, 14 and 15. This upward movement of the bars to bring the gate to open position is facilitated by the action of counterweight 7, which also aids in rendering the return movement of the gate a slow and easy one.

To hold the bars in properly spaced relation stops 28 are provided.

The post 6 is cut out to form a shoulder 29 and the uppermost bar 12 is made slightly longer than the remaining bars to provide a projecting end, adapted to rest upon this shoulder when the gate moves to closed position. This limits the downward or closing movement of the gate.

By referring to the dotted lines shown in Fig. 1 and the illustration of Fig. 4 it will be seen that the post 6 presents a channeled structure above the shoulder 29 in which the projecting end of the bar 12 moves. Flat springs 30 are secured in this channeled portion of the post, between which springs such projecting end of the uppermost bar 12 moves, and which springs in conjunction with the action of the counterweight serve to retard the closing movement of the gate so as to bring it to rest without shock or jar. Furthermore these springs prevent the accidental opening of the gate by stock rooting thereunder or otherwise. Post 6 is also channeled to constitute a guide for the ends of bars 13, 14, and 15. It is to be understood that the invention is not limited to the precise construction shown and described but that, upon the contrary, it includes all within the terms or the spirit of the appended claims.

Having described my invention what I claim is:

1. In a gate construction, the combination with a plurality of bars pivoted at one end to swing from a vertical to a horizontal position, eyes extending downwardly from all of the bars except the lowermost bar and straps having offset portions with which said eyes are engaged, said straps being mounted upon the upper edges of the respective bars.

2. A structure as recited in claim 1, in combination with abutments between the bars to limit their closing movement with respect to each other.

In testimony whereof he affixes his signature.

SCOTT WILLOCK.